Figure 1:
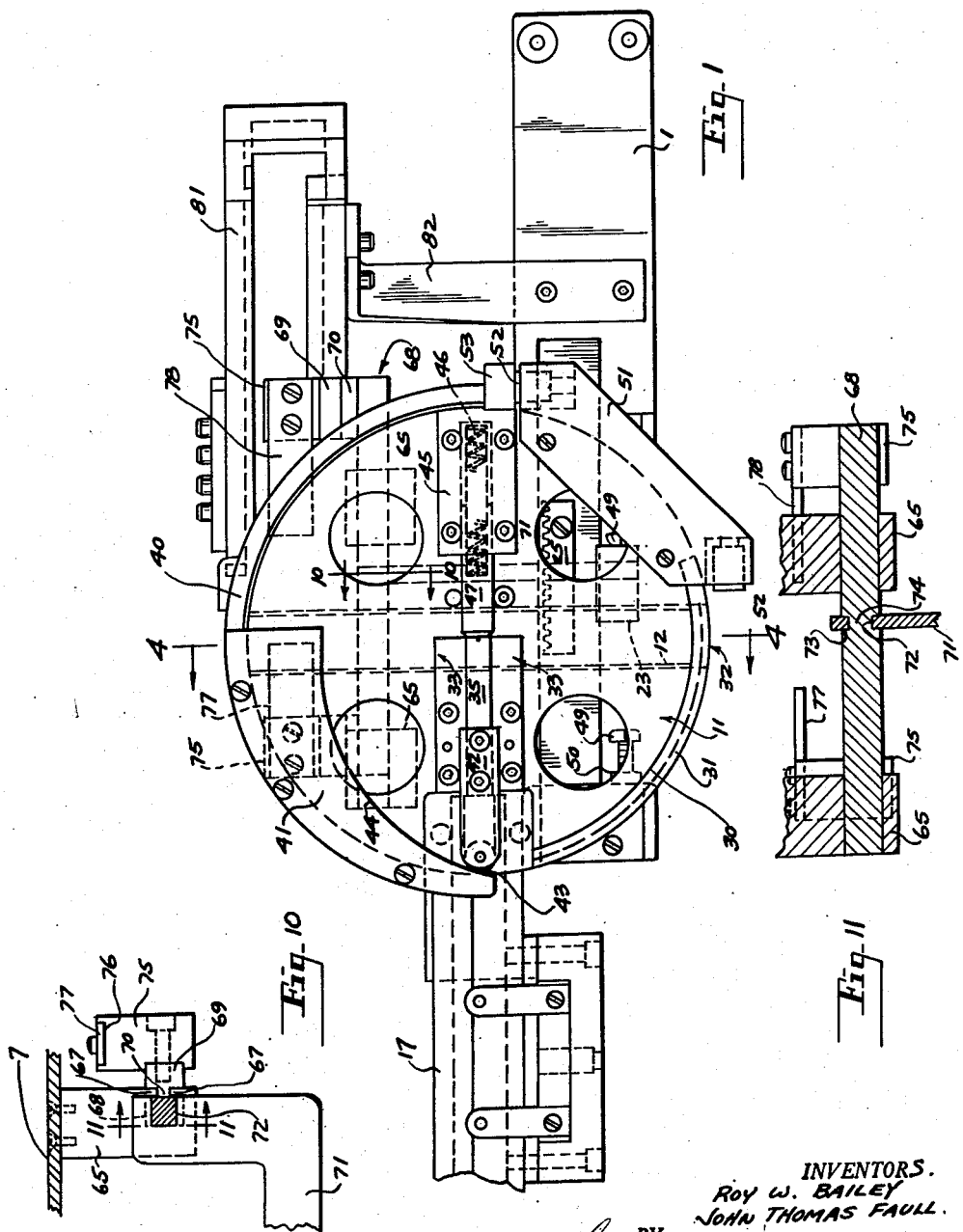

Dec. 14, 1954    R. W. BAILEY ET AL    2,696,902
ORIENTING DEVICE

Filed Oct. 1, 1953    4 Sheets-Sheet 1

INVENTORS.
Roy W. BAILEY
JOHN THOMAS FAULL
BY
ATTORNEY.

Dec. 14, 1954   R. W. BAILEY ET AL   2,696,902
ORIENTING DEVICE

Filed Oct. 1, 1953   4 Sheets-Sheet 2

INVENTORS.
ROY W. BAILEY.
JOHN THOMAS FAULL
BY
ATTORNEY.

Dec. 14, 1954

R. W. BAILEY ET AL 2,696,902

ORIENTING DEVICE

Filed Oct. 1, 1953

4 Sheets-Sheet 3

INVENTORS.
ROY W. BAILEY.
JOHN THOMAS FAULL.

BY

ATTORNEY.

Dec. 14, 1954  R. W. BAILEY ET AL  2,696,902
ORIENTING DEVICE
Filed Oct. 1, 1953  4 Sheets-Sheet 4
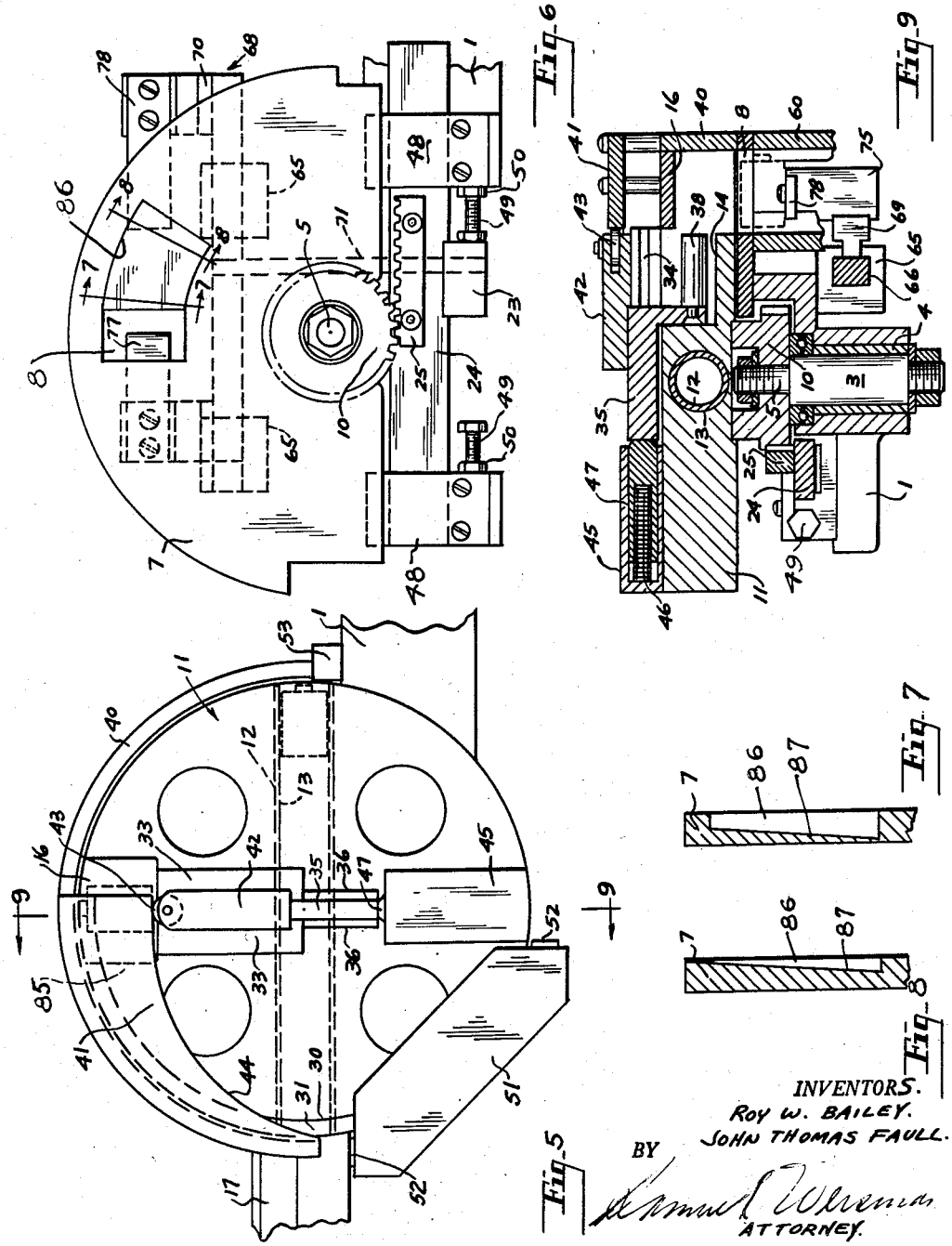
INVENTORS.
ROY W. BAILEY.
JOHN THOMAS FAULL.
BY
ATTORNEY.

United States Patent Office 2,696,902
Patented Dec. 14, 1954

2,696,902

ORIENTING DEVICE

Roy W. Bailey and John T. Faull, Detroit, Mich., assignors to Detroit Power Screwdriver Company, Detroit, Mich., a corporation of Michigan Application October 1, 1953, Serial No. 383,527

11 Claims. (Cl. 198—33)

The present invention pertains to a novel device for orienting shell-like work pieces and delivering them uniformly to a chute that leads to another apparatus.

The work pieces are delivered in lengthwise position to the orienting device. Some will reach the device open end first and others closed end first. The orienting device handles the work pieces so that all are delivered with the open end facing in the same direction.

The principal object of the invention is to provide a reliable and effective mechanism for performing this operation.

The device of the invention includes an oscillated disk having a peripheral pocket adapted to aline with the chute. The disk is mounted on a support having a hole therethrough spaced from the chute end with which the pocket is adapted to register on oscillation.

A slidable pin extends into the pocket, and work piece that approaches the pocket open end first will seat on the pin. As the pocket is moved toward the hole, the pin is withdrawn from the pocket, and the piece drops through the hole into a discharge chute, with its open end facing inward on the disk.

A piece that approaches the disk closed end first is stopped by the pin. The empty pocket moves toward the hole, while the work piece is retained at the chute. The disk is formed with a diametrical hole spaced angularly from the pocket. At the end of the first half of the oscillation, the diametrical hole receives the work piece, which now slides through the diametrical hole but is stopped at the opposite end thereof. On the second half of the oscillation, this end of the diametrical hole is brought, with the work piece therein, over the hole to the support. The disk has a hole through its bottom at the end of the diametrical hole where the work piece is held. This bottom hole becomes uncovered when it overlies the hole in the disk, so that the work piece drops through the disk into the chute. This piece, which approached the disk closed end first, has been dropped into the chute facing inward of the disk, in the same relative position as the piece that approached the disk open end first.

The discharge chute is equipped with an escapement mechanism that permits the work pieces to drop through it in regulated order. This mechanism is operated from the mechanism that oscillates the disk, which is preferably a fluid cylinder having its piston rod attached to a rack meshing with a gear on the disk.

Figure 2:
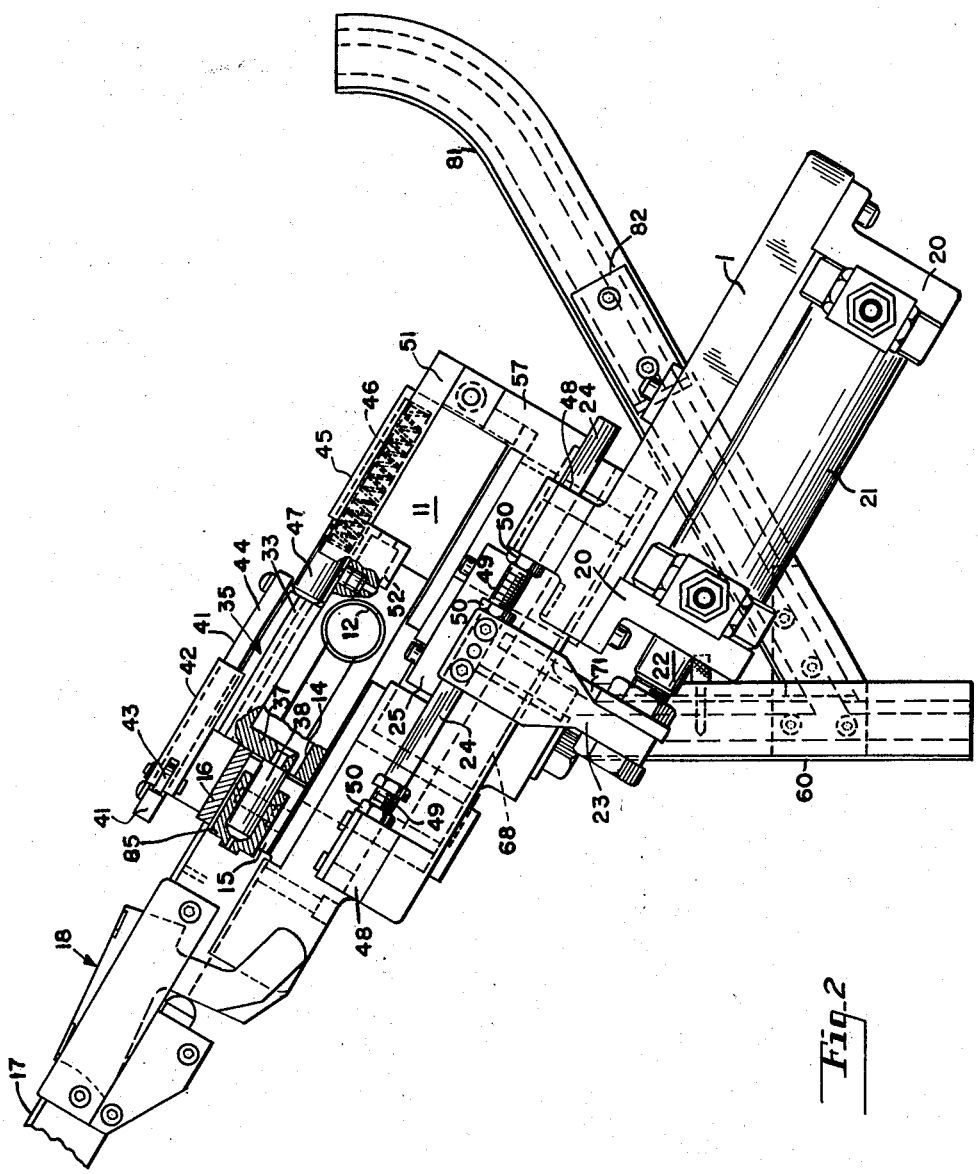
Figure 4:
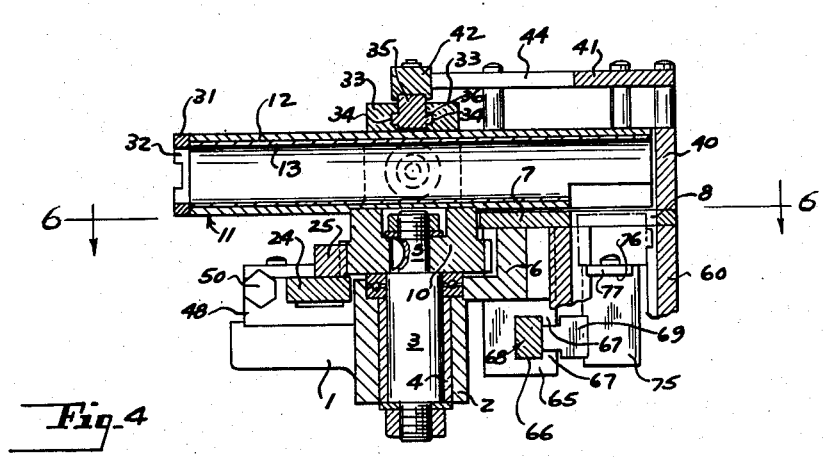
Figure 3:
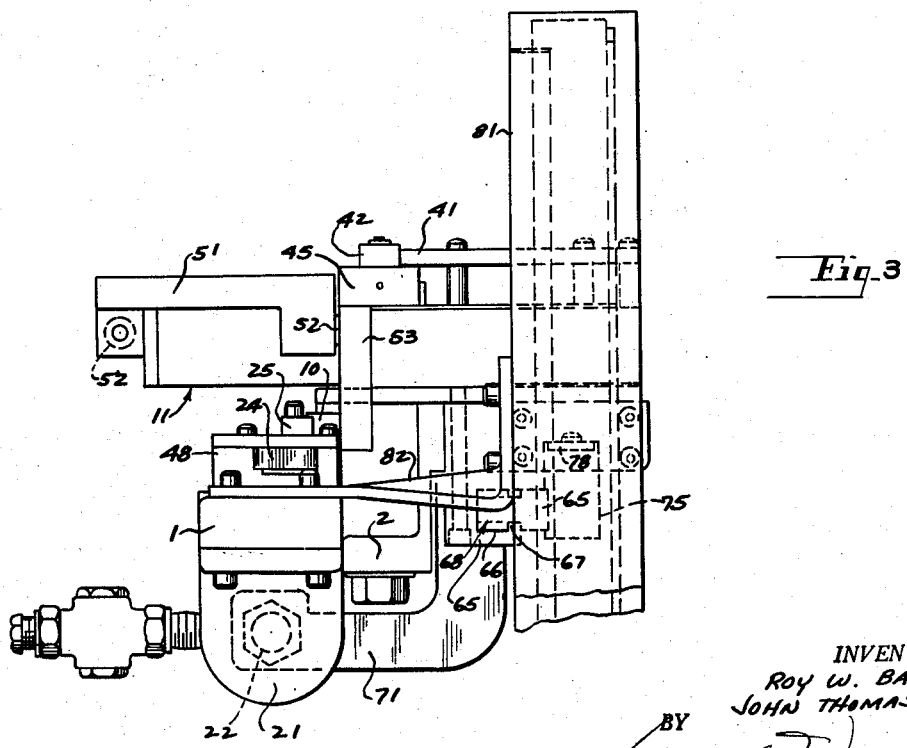

The invention is fully disclosed by way of example in the following description and in the accompanying drawings in which:

Figure 1 is a plan view of the device;
Figure 2 is a side elevation, partly in section;
Figure 3 is a vertical elevation at right angles to Figure 2;
Figure 4 is a section on the line 4—4 of Figure 1;
Figure 5 is a plan view showing the parts in a different position;
Figure 6 is an elevation on the line 6—6 of Figure 4;
Figures 7 and 8 are sections on the lines 7—7 and 8—8 of Figure 6;
Figure 9 is a section on the line 9—9 of Figure 5;
Figure 10 is a section on the line 10—10 of Figure 1, and
Figure 11 is a section on the line 11—11 of Figure 10.

Reference to these views will now be made by use of like characters which are employed to designate corresponding parts throughout.

The device is assembled on a mounting plate 1 which in turn may be attached to the standard of another machine or other support. The plate 1 is formed with a boss 2 (Figure 4) in which is rotatably mounted a shaft 3 in a bearing sleeve 4. The shaft 3 has a reduced extension 5 for a purpose that will presently be described. The plate 1 has an upwardly extending flange 6 on which is mounted a substantially semicircular dropout plate 7 having a dropout hole 8 for discharge of the parts as will be described.

On the extension 5 is secured a gear 10, and on the upper end of the gear is centrally mounted a circular selector member 11. This member has a diametrical hole 12 in which is fitted a liner 13. The member 11 also has a radical slot 14 (Figure 2) at right angles to the hole 12 terminating in a somewhat wider pocket 15. In the pocket is fitted an insert 16 shaped to receive and retain a work piece.

A chute 17 extends from a supply receptacle (not shown) to the selector member 11 to register at times with the insert 16 or the hole 12 by oscillation of the member 11 by means that will be described. In the chute 17 is mounted a suitable escapement mechanism designated generally by the numeral 18 and adapted to deliver the work pieces one at a time to the selector 11. The escapement may be of any suitable construction and therefore is not described in detail.

A bracket 20 (Figure 2) is secured beneath the mounting 1 to carry an air cylinder 21. The piston rod 22 extending from the cylinder carries an arm 23 to which is fastened a rack carrier 24 lying parallel to the axis of the cylinder. To the carrier 24 in turn is fastened a shorter rack 25 meshing with the gear 10. It may now be seen that the reciprocation of the rack with the piston rod 22 oscillates with the gear 10 and the selector member 11 as indicated above and shown in Figure 4.

Adjacent to the pocket 15, the diameter of the member 11 is reduced to form a notch 30 (Figure 1) extending about 90° to a point beyond the end of the hole 12. In this notch is secured a wall member 31 having a hole 32 registering with said end of the hole 12. The member 31 retains some of the work pieces reaching the lower end of the chute 17, during oscillation of the member 11.

On the top of the member 11, along the edges of the slot 14 are fastened guide strips 33. Each such strip has a longitudinal slot 34 in its side so that the slots face each other (Figure 4). Between the guides 33 is a slide 35 with ribs 36 received in the slots 34. At one end of the slide is a right angular foot 37 extending into the slot 14. A pin 38 lying centrally of the pocket 15 and radially of the member 11 is secured to the foot 37 as shown in Figure 2.

On the fixed plate 1 is mounted an arcuate strip 40 extending from the chute 17 in clockwise direction as in Figure 1, covering one end of the hole 12, but leaving open the previously mentioned end that is traversed by the member 31. On a portion of the member 40 is secured a camplate 41 extending approximately 90° from the chute 17. It will be noted that the member 40 is attached to the plate 7 which in turn is fastened to the flange 6 of the mounting 1. The cam 41 therefore retains a fixed position. An arm 42 is secured upon the slide 35 and carries a roller 43 riding on the cam surface 44 of the plate 41 (Figures 1 and 2).

Upon the member 11 in line with the slide 35 is mounted a spring retainer 45 containing a coil spring 46 normally projecting outwardly therefrom. On the exposed end of the spring is fitted a plunger 47 that bears against the inner end of the slide 35 when the latter begins to move inward by cam action, whereby the member 42 and the cam pin 38 are projected outwardly as far as permitted by the cam surface 44.

On the mounting 1 at opposite sides of the arm 23 are mounted bearing blocks 48 for the rack carrier slide 24, as shown in Figure 6. In each of these blocks is fitted a bolt 49 adjustably held by a lock nut 50. These bolts are in the path of the arm 23 and serve as adjustable stops for the arm and thus for the rack 25.

The rotatable member 11 carries a stop plate 51 with pads 52 in the ends, shown in Figure 5. One of the pads stops against the chute 17 and the other against a block 53 on the mounting 1, thereby limiting the movements of the oscillating member 11.

A discharge chute 60 is suspended from the fixed structure at the hole 8 in the plate 7. An escapement is provided in the chute 60 to prevent misalinement and jamming of the shell-like work pieces 61 dropped through the hole 8 by the means previously described.

For this purpose a pair of mounting blocks 65 are secured to the fixed plate 7 and alined on an axis parallel to the chute 17. Each block has an opening 66 (Figures 4 and 5) and a pair of inwardly extending opposing lips 67. An escapement slide 68 has a pair of laterally extended end portions 69 fitted in the openings 66 and retained by the lips 67 which enter opposed notches 70 in the portions 69.

A right angled arm 71 (Figures 3, 10 and 11) is secured at one end to the piston rod 22 and has its other end formed with a notch 72. At the center of the slide 68 are formed opposed notches 73. The narrowed portion 74 between the notches 73 is inserted in the notch 72, whereby the parts are interlocked by the engagement of the walls of notches 73 with the surfaces of the notched leg of the arm 71.

Upon each portion 69 is fastened a blade carrier 75 having a seat 76 formed in its upper surface. In the seats are secured escapement blades 77 and 78 extending into the chute 60 towards an area below the hole 8.

As the arm 71 is reciprocated with the piston rod 22, the slide 68 is likewise reciprocated. Thus, on movement of the slide 68, one of the escapement blades will move into the chute 60 and the other out of the chute. The length of the blades is such that one or the other will lie below the hole 8 to catch the work pieces 61 that have dropped through it, while in an intermediate position of the slide 68 neither blade will be in the chute and the piece 61 will be permitted to continue downward. The work pieces are delivered in a uniform relation through the chute to another machine (not shown) which performs a specified operation on them.

A lateral chute 81 is supported from the fixed structure by a suitable bracket 82 and enters the chute 60 below the orienting mechanism. The chute 81 is used for hand feeding in the event that the orienting mechanism is out of operation.

The operation of the device will now be summarized, although it has already been indicated in steps. A shell-like work piece 85 (Figure 2) descending the chute 17 open end first will be received on the pin 38. As the member 11 is turned by the rack 25 and the gear 10, the piece 85 will be advanced to the dropout hole 8. Meanwhile, the roller 43 riding on the cam edge 44 will withdraw the pin 38 from the work piece so that the piece will fall through the hole 8 to the escapement blades 76, 77.

If the work piece descends closed end first, it will be stopped by the pin 38. As the member 11 is turned, the piece will be held in the same position by the wall member 31. At a completion of the 90° movement of the member 11, the hole 12 of this member will register with the chute and receive the work piece. The latter will slide to the opposite end of the hole 12, due to the inclined position of the member 11, and will be stopped by the strip 40. On the reverse movement of the member 11 by the rack and gear, the work piece will be brought to the hole 8. For guiding the piece to the hole 8, the plate 7 is formed, on the clockwise side of the hole 8, with a pocket 86 with a bottom 87 that slopes in two directions, increasing in depth radially inward and counterclockwise as shown in Figures 6, 7 and 8.

Although a specific embodiment of the invention has been illustrated and described, it will be understood that various alterations in the details of construction will be made without departing from the scope of the invention as indicated by the appended claims.

What we claim is:

1. An orienting device comprising a support, a disk rotatably mounted thereon, a feed chute leading to said disk, a fixed plate beneath said disk and having a hole therethrough spaced angularly from said chute, said disk having a pocket adapted to register with said chute and with said hole, means for oscillating said disk to move said pocket from said chute to said hole, a slidably mounted pin extending from said disk into said pocket to receive a shell-like work piece delivered by said chute, a slide attached to said pin, a fixed cam on said support between said chute and said hole and engaged by said slide, said cam decreasing in its distance from the center of said disk as it proceeds from said chute to said hole and dimensioned to withdraw said pin from said pocket as the pin approaches said hole, and a discharge chute extending from said hole, said disk having a diametrical hole therethrough at an angle to the axis of said pin, the latter angle being equal to the angle between said chute and the first hole, the diametrical hole being adapted to register with said feed chute and to receive work pieces therefrom, means for obstructing the end of the diametrical hole opposite the end thereof that registers with the feed chute, said disk having a hole therethrough at the first named end of the diametrical hole and adapted to register with the first named hole to drop a work piece therein.

2. An orienting device comprising a support, a disk rotatably mounted thereon, a feed chute leading to said disk, a fixed plate beneath said disk and having a hole therethrough spaced angularly from said chute, said disk having a pocket adapted to register with said chute and with said hole, means for oscillating said disk to move said pocket from said chute to said hole, a slidably mounted pin extending from said disk into said pocket to receive a shell-like work piece delivered by said chute, a slide attached to said pin, a fixed cam on said support between said chute and said hole and engaged by said slide, said cam decreasing in its distance from the center of said disk as it proceeds from said chute to said hole and dimensioned to withdraw said pin from said pocket as the pin approaches said hole, and a discharge chute extending from said hole, said disk having a diametrical hole therethrough at an angle to the axis of said pin, the latter angle being equal to the angle between said chute and the first hole, the diametrical hole being adapted to register with said feed chute and to receive work pieces therefrom, a fixed stop plate on said support opposite said feed chute, extending to the first hole and positioned to obstruct one end of the diametrical hole when the other end thereof registers with the feed chute, said disk having a hole therethrough at the first named end of the diametrical hole and adapted to register with the first named hole to drop a work piece therein.

3. A device as set forth in claim 1, wherein the plane of said disk slopes downward from the first named chute, said disk having a diametrical hole therethrough at an angle to the axis of said pin, the latter angle being equal to the angle between said chute and the first hole, the diametrical hole being adapted to register with said feed chute and to receive work pieces therefrom, means for obstructing the end of the diametrical hole opposite the end thereof that registers with the feed chute, said disk having a hole therethrough at the first named end of the diametrical hole and adapted to register with the first named hole to drop a work piece therein.

4. A device as set forth in claim 2, wherein the plane of said disk slopes downward from the first named chute.

5. A device as set forth in claim 1, further characterized by an escapement mechanism in said discharge chute operatively connected to said means, said disk having a diametrical hole therethrough at an angle to the axis of said pin, the latter angle being equal to the angle between said chute and the first hole, the diametrical hole being adapted to register with said feed chute and to receive work pieces therefrom, means for obstructing the end of the diametrical hole opposite the end thereof that registers with the feed chute, said disk having a hole therethrough at the first named end of the diametrical hole and adapted to register with the first named hole to drop a work piece therein.

6. A device as set forth in claim 2, further characterized by an escapement mechanism in said discharge chute operatively connected to said means.

7. An orienting device comprising a support, a disk rotatably mounted thereon, a feed chute leading to said disk, a fixed plate beneath said disk and having a hole therethrough spaced angularly from said chute, said disk having a pocket adapted to register with said chute and with said hole, a gear on said disk, a rack slidably mounted on said support and meshing with said gear, means for oscillating said rack, whereby to move said pocket from said chute to said hole, a slidably mounted pin extending from said disk into said pocket to receive a shell-like work piece delivered by said chute, a slide attached to said pin, a fixed cam on said support between said chute and said hole and engaged by said slide, said cam decreasing in its distance from the center of said disk as it proceeds from said chute to said hole and dimensioned to withdraw said pin from said pocket as the pin approaches said hole, and a discharge chute extending from said hole, said disk having a diametrical hole therethrough at an angle to the axis of said pin, the latter angle being equal to the angle between said chute and the first hole, the diametrical hole being adapted to register with said feed chute and to receive work pieces therefrom, means for obstructing the end of the diametrical hole opposite the end thereof that registers with the feed chute, said disk having a hole therethrough at the first named end of the diametrical hole and adapted to register with the first named hole to drop a work piece therein.

8. An orienting device comprising a support, a disk rotatably mounted thereon, a feed chute leading to said disk, a fixed plate beneath said disk and having a hole therethrough spaced angularly from said chute, said disk having a pocket adapted to register with said chute and with said hole, a gear on said disk, a rack slidably mounted on said support and meshing with said gear, means for oscillating said rack, whereby to move said pocket from said chute to said hole, a slidably mounted pin extending from said disk into said pocket to receive a shell-like work piece delivered by said chute, a slide attached to said pin, a fixed cam on said support between said chute and said hole and engaged by said slide, said cam decreasing in its distance from the center of said disk as it proceeds from said chute to said hole and dimensioned to withdraw said pin from said pocket as the pin approaches said hole, and a discharge chute extending from said hole, said disk having a diametrical hole therethrough at an angle to the axis of said pin, the latter angle being equal to the angle between said chute and the first hole, the diametrical hole being adapted to register with said feet chute and to receive work pieces therefrom, a fixed stop plate on said support opposite said feed chute, extending to the first hole and positioned to obstruct one end of the diametrical hole when the other end thereof registers with the feed chute, said disk having a hole therethrough at the first named end of the diametrical hole and adapted to register with the first named hole to drop a work piece therein.

9. A device as set forth in claim 6, further characterized by an escapement mechanism in said discharge chute operatively connected to said means.

10. A device as set forth in claim 6, wherein the plane of said disk slopes downward from the first named chute.

11. A device as set forth in claim 6, wherein the plane of said disk slopes downward from the first named chute, and further characterized by an escapement mechanism in said discharge chute operatively connected to said means.

References Cited in the file of this patent

UNITED STATES PATENTS

| Number | Name | Date |
|---|---|---|
| 1,739,422 | Schmidt | Dec. 10, 1929 |
| 2,630,221 | Stewart | Mar. 3, 1953 |

FOREIGN PATENTS

| Number | Country | Date |
|---|---|---|
| 453,052 | Germany | Nov. 28, 1927 |